(12) United States Patent
Fujita et al.

(10) Patent No.: US 6,293,466 B1
(45) Date of Patent: *Sep. 25, 2001

(54) BAR CODE IMAGE PROCESSING APPARATUS

(75) Inventors: Mikio Fujita, Yokohama; Atsuharu Yamamoto, Kawasaki; Toyoki Kawahara, Kawasaki; Kunio Yoshida, Kawasaki; Toru Asano, Sagamihara; Shigeo Komizo, Tokyo, all of (JP)

(73) Assignee: Matsushita Electric Industrial Co., Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/007,146

(22) Filed: Jan. 14, 1998

(30) Foreign Application Priority Data

Jan. 14, 1997 (JP) .................................................... 9-004324

(51) Int. Cl.$^7$ ....................................................... G06K 7/10
(52) U.S. Cl. ................................. 235/462.02; 235/462.08
(58) Field of Search ..................... 235/462.02, 462.07, 235/462.08, 462.09, 462.1, 462.16, 462.18

(56) References Cited

U.S. PATENT DOCUMENTS

| 4,513,442 | * | 4/1985 | Scherl ..................................... 382/49 |
| 4,533,825 | * | 8/1985 | Yamada ............................. 235/462.07 |
| 5,073,954 | * | 12/1991 | Van Tyne et al. ................ 235/462.08 |
| 5,134,272 | * | 7/1992 | Tsuchiya et al. ................. 235/462.08 |
| 5,262,623 | * | 11/1993 | Batterman et al. ................... 235/454 |
| 5,319,181 | * | 6/1994 | Shellhammer et al. ......... 235/462.09 |
| 5,369,264 | * | 11/1994 | Rosa et al. ........................ 235/462.02 |
| 5,369,265 | * | 11/1994 | Adachi et al. ................... 235/462.05 |
| 5,428,211 | * | 6/1995 | Zheng et al. ..................... 235/462.02 |
| 5,502,296 | * | 3/1996 | Kawai et al. ..................... 235/462.07 |
| 5,602,382 | * | 2/1997 | Ulvr et al. ............................. 235/494 |
| 5,610,995 | * | 3/1997 | Zheng et al. ................. 235/462.25 X |
| 5,691,527 | * | 11/1997 | Hara et al. ............................ 235/456 |
| 5,726,435 | * | 3/1998 | Hara et al. ............................ 235/494 |
| 5,818,031 | * | 10/1998 | Endoh .................................. 235/494 |
| 5,925,865 | * | 7/1999 | Steger .......................... 235/462.01 X |
| 5,992,747 | * | 11/1999 | Katoh et al. ..................... 235/462.43 |

FOREIGN PATENT DOCUMENTS

| 3205189 | * | 8/1983 | (DE) . |
| 57-59285 | * | 4/1982 | (JP) . |
| 2-125386 |   | 5/1990 | (JP) . |

* cited by examiner

Primary Examiner—Karl D. Frech
Assistant Examiner—Diane I. Lee
(74) Attorney, Agent, or Firm—Israel Gopstein

(57) ABSTRACT

An image input section enters a document image including a bar code, and converts the document image into a binary image. A small pattern removing section removes small patterns from a binary image sent from the input section. A labeling section separates the binary image into labeled regions and calculates the feature quantity including a center position of each labeled region. A region detecting section makes a group of labeled regions spaced at a predetermined positional relationship based on their feature quantities and detects a bar code candidate region. A decoding section decodes the bar code based on the feature quantity involved in the bar code candidate region.

10 Claims, 10 Drawing Sheets

FIG. 3A

MAIN SCANNING →
SUB SCANNING ↓

| d4 | d3 | d2 |
|----|----|----|
| d5 | d0 | d1 |
| d6 | d7 | d8 |

FIG. 3B

| 0 | 0 | 0 |
|---|---|---|
| 0 | 1 | 0 |
| 0 | 0 | 0 |

FIG. 3C

| 0 | 0 | 0 |
|---|---|---|
| 0 | 1 | 0 |
| 1 | 1 | 1 |

FIG. 3D

| 1 | 1 | 1 |
|---|---|---|
| 1 | 0 | 1 |
| 1 | 1 | 1 |

FIG. 6

| REGION NUMBER | SUM X | SUM Y | s | xg | yg |
|---|---|---|---|---|---|
| 1 | X(1) | Y(1) | s(1) | xg(1) | yg(1) |
| 2 | X(2) | Y(2) | s(2) | xg(2) | yg(2) |
| ⋮ | ⋮ | ⋮ | ⋮ | ⋮ | ⋮ |
| i | X(i) | Y(i) | s(i) | xg(i) | yg(i) |
| ⋮ | ⋮ | ⋮ | ⋮ | ⋮ | ⋮ |

FIG. 8

| ITEM | CONTENT |
|---|---|
| i | SERIAL GROUP NUMBER |
| gr_flag | FLAG INDICATING VALIDITY OF GROUP INFORMATION (VALID [1]; INVALID [0]) |
| bar_flag | FLAG INDICATING BAR CODE CANDIDATE REGION CANDIDATE [1] NON-CANDIDATE [0] |
| member | TOTAL NUMBER OF ISLET REGIONS INVOLVED IN A GROUP |
| x[0]<br>y[0]<br>s[0]<br>bar[0] | X COORDINATE OF ISLET REGION'S CENTER-OF-GRAVITY<br>Y COORDINATE OF ISLET REGION'S CENTER-OF-GRAVITY<br>AREA OF ISLET REGION<br>TYPE OF BAR |
| x[1]<br>y[1]<br>s[1]<br>bar[1] | X COORDINATE OF ISLET REGION'S CENTER-OF-GRAVITY<br>Y COORDINATE OF ISLET REGION'S CENTER-OF-GRAVITY<br>AREA OF ISLET REGION<br>TYPE OF BAR |
| ...... | |
| x[member-1]<br>y[member-1]<br>s[member-1]<br>bar[member-1] | X COORDINATE OF ISLET REGION'S CENTER-OF-GRAVITY<br>Y COORDINATE OF ISLET REGION'S CENTER-OF-GRAVITY<br>AREA OF ISLET REGION<br>TYPE OF BAR |

BAR CODE IMAGE PROCESSING APPARATUS

BACKGROUND OF THE INVENTION

1. Field of the Invention

The present invention relates to a bar code image processing apparatus which is capable of identifying the position and the direction of a bar code when reading and decoding a bar code from a document (e.g., mail) image including letters, figures and patterns.

2. Prior Art

Bar codes are widely used for many purposes in various fields. FIG. 11 shows a conventional bar code reading technique, disclosed in Unexamined Japanese Patent Application No. 2-125386 (published in 1990), which enters a two-dimensional image of an object, extracts each bar code region involved in the entered image through image processing, and decodies a bar code.

More specifically, in an image processing arrangement shown in FIG. 11, image data are entered through an input terminal 901 into a binary coding section 903 in which the entered image data are changed into binary data. A binary level variation detecting section 904 converts the binary data into a contour image. A black expanding section 905 unites the periodically aligned contour lines of the bar code and paints out the bar code region. Next, a black contracting section 906 erases the background and extracts the bar code region. Numeral 907 represents a regressive straight line calculating section, numeral 908 represents a reading coordinate calculating section, numeral 902 represents an image signal memory section, and reference numeral 909 represents a bar code decoding section. Thus, along a regressive straight line of the extracted region, the image data are read and decoded.

However, according to the above-described conventional bar code image processing apparatus, it is difficult to correctly separate the bar code region from the background image when the length of a bar is short in comparison with a bar pitch.

SUMMARY OF THE INVENTION

In view of the foregoing, a principal object of the present invention is to provide a reliable bar code image processing apparatus which is capable of accurately detecting and decoding a bar code region regardless of the position and the direction of the bar code.

In order to accomplish the above-described and other related objects, the present invention provides an excellent and reliable bar code image processing apparatus characterized by the following features. A labeling means labels a document image including a bar code and detects a feature quantity including a center (e.g. center of gravity) position of each labeled region. A region detecting means makes a group of labeled regions spaced at a predetermined positional relationship based on feature quantities of the labeled regions and detects a bar code candidate region. A decoding means identifies a type of each bar based on the feature quantity involved in the bar code candidate region and decodes the bar code.

Preferably, a small pattern removing means is provided for erasing predetermined small patterns from the document image before the document image is labeled.

Preferably, the labeling means detects a labeled region which requires no rewriting as a result of a detection of identity between labels.

Preferably, the labeling means detects at least one feature quantity selected from the group consisting of an area, a peripheral length and a circumscribed rectangle.

Preferably, the decoding means decodes the bar code based on an area and a center (e.g. center of gravity) position of each bar.

Preferably, the bar code is a 4-state code including a long bar, a semi-long bar and a timing bar, or a JAN code. In this case, the decoding means discriminates a bar type among the long bar, the semi-long bar and the timing bar based on an area of each pattern. Then, the decoding means obtains a line passing center positions of the long and timing bars, and detects a phase relationship of the semi-long bar with respect to the obtained line to decode the bar code based on the obtained phase relationship.

BRIEF DESCRIPTION OF THE DRAWINGS

The above and other objects, features and advantages of the present invention will become more apparent from the following detailed description which is to be read in conjunction with the accompanying drawings, in which:

FIGS. 3A to 3D are views showing a judgement mask used in a small pattern removing section of the bar code image processing apparatus in accordance with the preferred embodiment of the present invention;

FIG. 6 is a feature quantity table which is used to register the feature quantity of each region labeled by the labeling section of the bar code image processing apparatus in accordance with the preferred embodiment of the present invention;

FIG. 8 is a group table which is used to register the feature quantity of each islet region grouped by the region judging section of the bar code image processing apparatus in accordance with the preferred embodiment of the present invention;

DESCRIPTION OF THE PREFERRED EMBODIMENT

Figure 1:
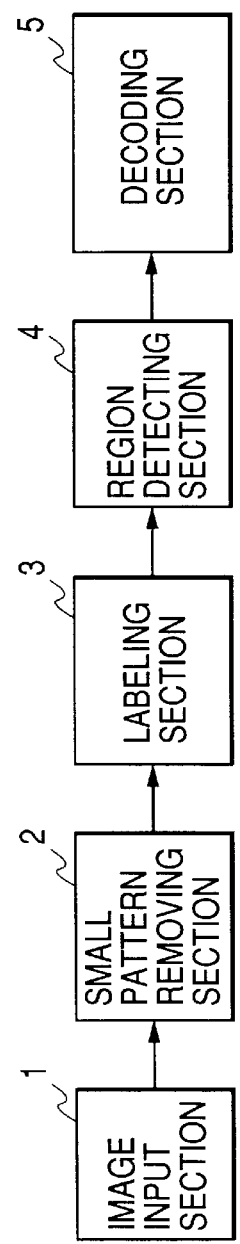
FIG. 1 is a block diagram showing an arrangement of a bar code image processing apparatus in accordance with a preferred embodiment of the present invention.

A preferred embodiment of the present invention will be explained with reference to the accompanying drawing.

Identical parts are denoted by the same reference numerals throughout the drawing.

FIG. 1 is a block diagram showing an arrangement of a bar code image processing apparatus in accordance with a preferred embodiment of the present invention. In FIG. 1, numeral 1 represents an image input section which reads a document including a bar code and produces a binary image of the read image. The image input section 1 is connected to a small pattern removing section 2 which removes small patterns, such as noises and notches, from the binary image sent from the image input section 1. The small pattern removing section 2 is connected to a labeling section 3 which performs a labeling operation applied to the binary image and obtains the feature quantity (e.g., an area and a center-of-gravity position) of each labeled region. The labeling section 3 is connected to a region detecting section 4 which detects a bar code candidate region based on the feature quantity of each labeled region. The bar code candidate region, thus detected, has an alternate pattern which consists of a plurality of islet regions having a predetermined area and spaced at predetermined clearances. The region detecting section 4 is connected to a decoding section 5 which decodes the bar code by discriminating the type of each bar involved in the bar code candidate region.

Figure 2:
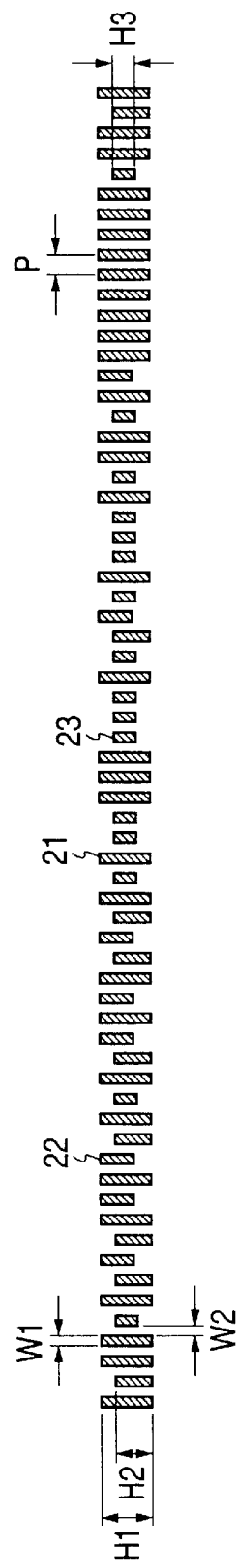
FIG. 2 is a view showing a bar code as an object to be read by the bar code image processing apparatus in accordance with the preferred embodiment of the present invention.

An operation of the above-described bar code image processing apparatus will be explained hereinafter. According to the preferred embodiment of the present invention, an image scanner reads the document at a scanning line density of approximately 8 lines/mm. The image scanner is equipped with a CCD line sensor for inputting the image. As shown in FIG. 2, the input image comprises various kinds of bars, such as a long bar 21, a semi-long bar 22 and a timing bar 23, which are preferably used as a mail bar (4-state) code including address information. Each bar has the following size (actual size in parenthesis). A long bar length "H1" is 29 pixels (3.6 mm). A semi-long bar length "H2" is 19 pixels (2.4 mm). A timing bar length "H3" is 10 pixels (1.2 mm). A bar width "W1" is 5 pixels (0.6 mm). A bar space "W2" is 5 pixels (0.6 mm). And, a pitch "P" is 10 pixels (1.2 mm).

A document including a bar code is read by the image input section 1. The image input section 1 produces a binary image including bars valued by 1 and the background valued by 0. The binary-coding operation of the preferred embodiment is performed in the following manner. A pre-scanning operation using a fixed threshold is performed to obtain a brightness histogram of a given document. Then, referring to the obtained brightness histogram, an appropriate threshold is selected to discriminate the pattern and the background. The selected threshold is located between a peak of the pattern and a peak of the background. Then, using the selected threshold, the input image is binary-encoded. The binary image thus obtained is sent to the small pattern removing section 2.

Next, the small pattern removing section 2 will be explained with reference to FIGS. 3A to 3D. FIGS. 3A to 3D show examples of a judgement mask of 3×3 pixels used when small patterns are removed. FIG. 3A defines each pixel of the 3×3 judgement mask. FIG. 3B shows an isolated point. FIG. 3C shows a peripheral notch of a pattern. FIG. 3D shows a hole in a pattern. Regarding details of the processing performed in the small pattern removing section 2, a value 0 is output to a central pixel position with respect to each of FIGS. 3B and 3C, while a value 1 is output with respect to FIG. 3D. Namely, the binary image is raster scanned by the 3×3 pixel window. A conversion value for the concerned pixel is obtained based on the bit pattern of the concerned pixel and its peripheral 8 pixels. This processing is realized by a window scanning using a line buffer and a shift register and a pattern judgement using a look-up table (LUT). This is a generally well-known technique, therefore no further explanation will be required.

According to the preferred embodiment of the present invention, the window scanning is repeated four times to convert the image. The value for the concerned pixel is converted from 1 to 0 in an odd-number processing and converted from 0 to 1 in an even-number processing. FIGS. 3A–3D merely show representative conversion pattern examples. Actual processing is performed in the following manner.

The value for the concerned pixel is converted with respect to a pattern determined by the following conditions (1) and (2).

(d0=1) and $$\left(\sum_{i=1}^{8} di > 4\right) \tag{1}$$

The condition (1) is applied to a pattern converted in the odd-number scanning.

(d0=0) and $$\left(\sum_{i=1}^{8} di \leq 4\right) \tag{2}$$

The condition (2) is applied to a pattern converted in the even-number scanning.

By performing the above-described small pattern removing operation, any isolated pattern within two or thee pixels is removed. Thus, it becomes possible to remove noise patterns other than the bar code region.

Figure 4:
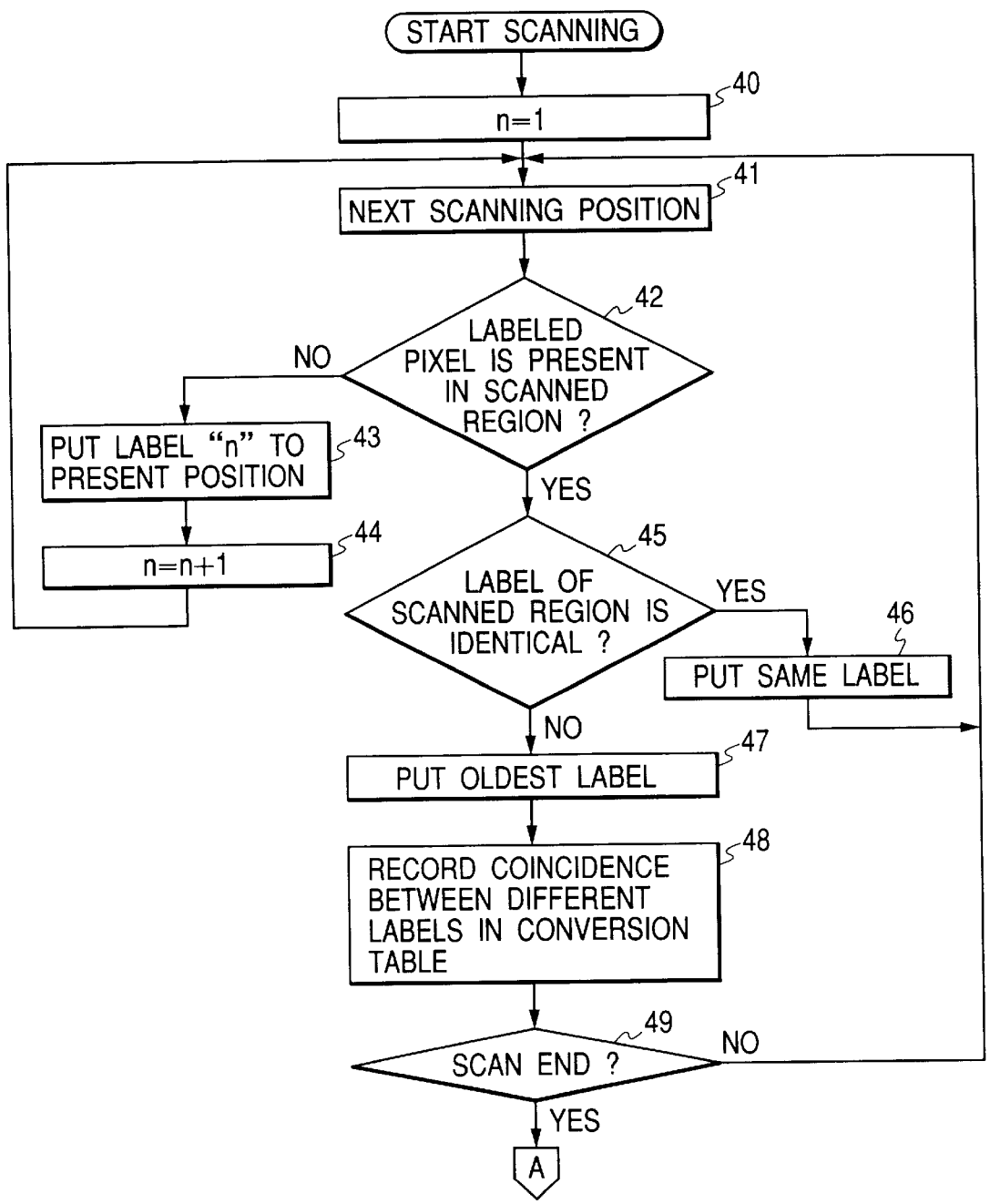
FIGS. 4 and 5 are flowcharts collectively showing a labeling procedure performed by a labeling section of the bar code image processing apparatus in accordance with the preferred embodiment of the present invention.
Figure 5:
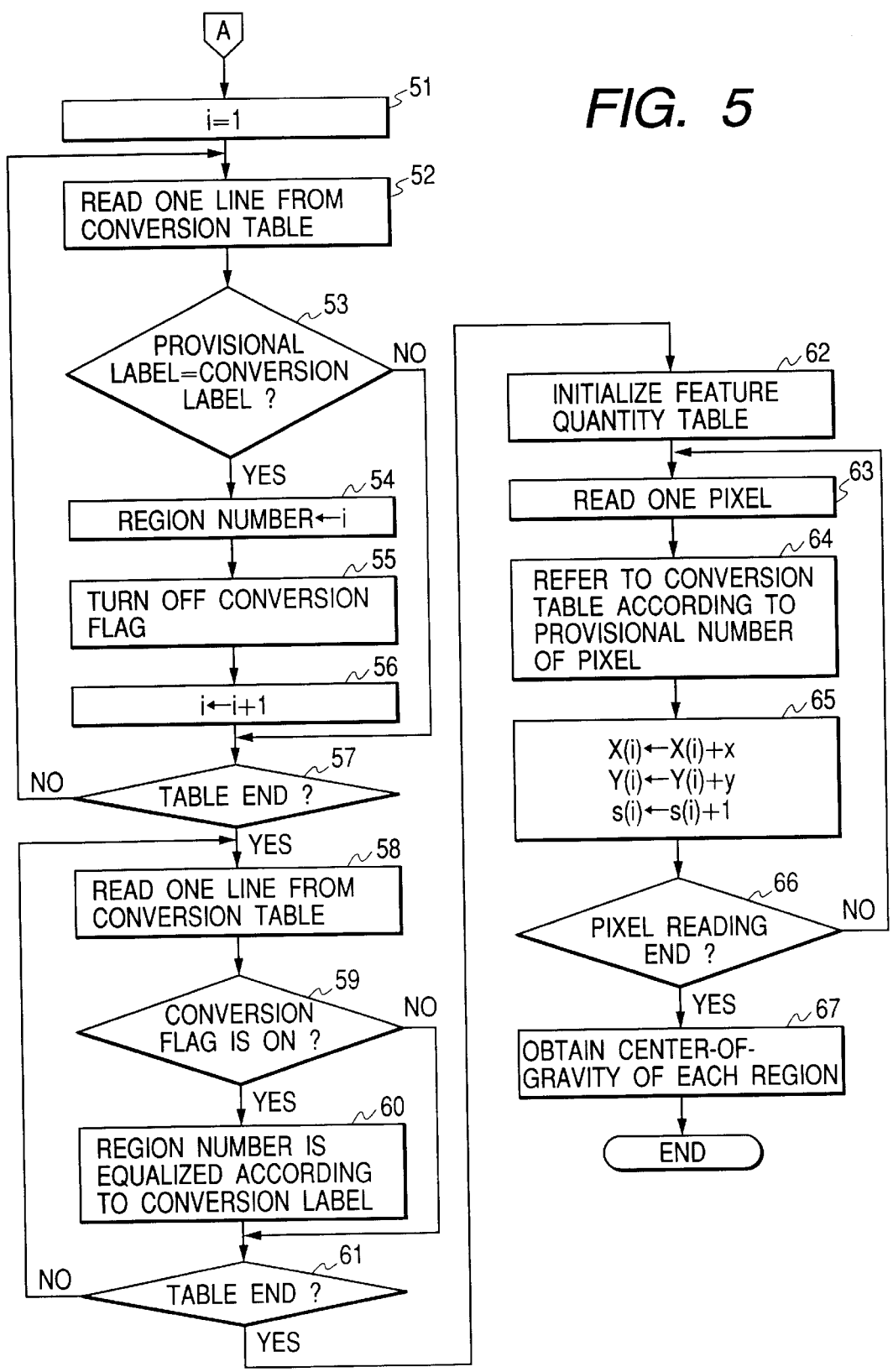

Next, the labeling section 3 will be explained in greater detail with reference to FIGS. 4 to 6. FIG. 4 is a flowchart showing a provisional labeling procedure which is performed in the labeling section 3. FIG. 5 is a flowchart showing a label changing or renewing procedure. FIG. 6 is a feature quantity table in which the feature quantity of each labeled region is registered.

The provisional labeling procedure will be explained hereinafter in greater detail with reference to the flowchart of FIG. 4. Step 40 sets 1 as an initial value for the label "n" (i.e., n=1). Step 41 selects a first scanning position of the input image. Step 42 judges whether a labeled pixel is present in an already scanned region in the vicinity of the concerned pixel position d0 within the window (i.e., pixels d2, d3, d4, and d5 shown in FIG. 3A). When the judgement result is "No" in the step 42, the control flow proceeds to step 43 in which a label "n" is put on the present scanning position. Subsequently, the control flow proceeds to step 44 in which the label "n" is incremented by 1 (i.e., n=n+1). Then, the control flow returns to step 41.

When the judgement result is "Yes" in the step 42, the control flow proceeds to step 45 to judge whether all of peripheral pixels in the vicinity of the concerned pixel have the same labels. When the judgement result is "Yes" in step 45, the control flow proceeds to step 46 in which the same label as that of the peripheral pixels is put on the concerned pixel. Then, the control flow returns to step 41. When the judgement result is "No" in step 45, the control flow proceeds to step 47 in which the concerned pixel is put the oldest label (i.e., the label having a smallest number). Subsequently, the control flow proceeds to step 48.

The step 48 records the identity (i.e., coincidence in type) between different labels. For example, a pattern having branches may be changed into a pattern having no branches due to merging of the branches in accordance with the advancement of the scanning operation. In such a case, different labels will be put on the same pattern, although the same label should be put on. Thus, the relationship that these labels are same is recorded on a conversion table. The conversion table is a look-up table recoding various items including the provisional label, a conversion flag, a conversion number, and a region nunber. To assign the same label number to all of labels in the already scanned region, the conversion flag is turned on with respect to the label numbers of the pixels d0, d2, d3, d4 and d5. Converted label numbers are registered. Then, the control flow processes to step 49 to judge whether the scanning operation is finished. When the scanning operation is finished (i.e., "Yes" in step 49), the control flow proceeds to the flowchart of FIG. 5. When the judgement result is "No" in step 49, the control flow returns to the step 41. By repeating the above-described procedure, appropriate provisional labels are put to all of patterns contained in the image.

Next, the processing for rewriting the conversion table and obtaining the feature quantity of each pattern will be explained with reference to FIGS. 5 and 6. In the flowchart of FIG. 5, steps 51 to 61 show the procedure for rewriting the conversion table and steps 62 to 67 show the procedure for obtaining the feature quantity of each pattern.

First, step 51 sets 1 to the region number "i." Then, step 52 reads one line from the conversion table. Then, control flow proceeds to step 53 to judge whether the provisional label is identical with a conversion label. When the provisional label is equal to the conversion label (i.e., "Yes" in step 53), the control flow proceeds to step 54. When the judgement result is "No" in the step 53, the control flow returns to the step 52 via step 57 to read the next line from the conversion table. The step 54 assigns the number "i" as the region number. Then, step 55 turns off the conversion flag. Subsequently, step 56 increments the region number by 1 (i.e., i=i+1). The control flow then proceeds to step 57 to judge whether the conversion table is processed completely. When the processing for the conversion table is terminated ("Yes" in step 57), the control flow proceeds to step 58. When the judgement result is "No" in the step 57, the control flow returns to the step 52 to read the next line from the conversion table and repeat the procedure of the above-described steps 52 to 57.

Step 58 starts a label equalizing operation based on the conversion flag. Step 58 reads one line from the conversion table. Then, step 59 judges whether the conversion flag is turned on. When the conversion flag is turned on (i.e., "Yes" in step 59), the control flow proceeds to step 60. When the judgement result is "No" in the step 59, the control flow returns to the step 58 via step 61 to read the next line from the conversion table. Step 60 sets a region number of the present concerned label. The region number of the present concerned label is equalized with the region number of a number position identified by the conversion label. The step 61 judges whether the conversion table is processed completely. When the processing for the conversion table is terinnated ("Yes" in step 61), the control flow proceeds to step 62. When the judgement result is "No" in the step 61, the control flow returns to the step 58 to read the next line from the conversion table and repeat the procedure of the above-described steps 59 to 61. The above-described label equalizing operation is repeated until the conversion table is completely processed. Thus, the conversion table is converted into a table having continuous region numbers.

Step 62 starts the procedure for obtaining the feature quantity of each region. FIG. 6 shows a feature quantity table. Step 62 initializes (i.e., puts 0 to) each item in the feature quantity table. The feature quantity of each pattern is obtained based on the image information assigned by the provisional label.

Step 63 reads one pixel. Then, step 64 checks the region number with reference to the conversion table based on the present provisional label number. Subsequently, step 65 adds the coordinate values of the present concerned pixel to the corresponding position on the feature quantity table.

$X(i)=X(i)+(x$ coordinate value of present concerned pixel$)$ $Y(i)=Y(i)+(y$ coordinate value of present concerned pixel$)$ where $X(i)$ and $Y(i)$ are coordinate values of the region number "i."

Then, the total number $s(i)$ is incremented by 1.

$s(i)=s(i)+1$

Then, the control flow proceeds to step 66 to judge whether the pixel reading operation is completed. When the pixel reading operation is completed (i.e., "Yes" in step 66), the control flow proceeds to step 67. When the judgement result is "No" in the step 66, the control flow returns to the step 63 to read the next pixel and repeat the processing of the steps 63 to 66.

Step 67 calculates a center (e.g. center of gravity) position whose coordinate values are represented by $X(i)/s(i)$ and $Y(i)/s(i)$. The center position is obtained with respect to every region of the feature quantity table shown in FIG. 6. The obtained center position is written as $xg(i)$ and $yg(i)$ in the feature quantity table of FIG. 6. As a result, the above-described procedure obtains the feature quantity of each connected pattern in the input image, i.e., an area and a center position.

According to the preferred embodiment of the present invention, the feature quantity is represented in terms of the area of each pattern. However, it is possible to replace the area by a peripheral length or a circumscribed rectangle of the pattern, as long as the obtained feature quantity can be used in the judgement performed in the succeeding region judging section 4.

In the labeling section 3, each bar constituting a bar code is a convex figure having no branches. Thus, utilizing such characteristics, it is possible to omit the processing of steps 51 to 61 and the processing of steps 62 to 67 can be applied to only limited regions corresponding to the numbers whose conversion flag is turned off in the conversion table. The processing speed is increased.

Figure 7:
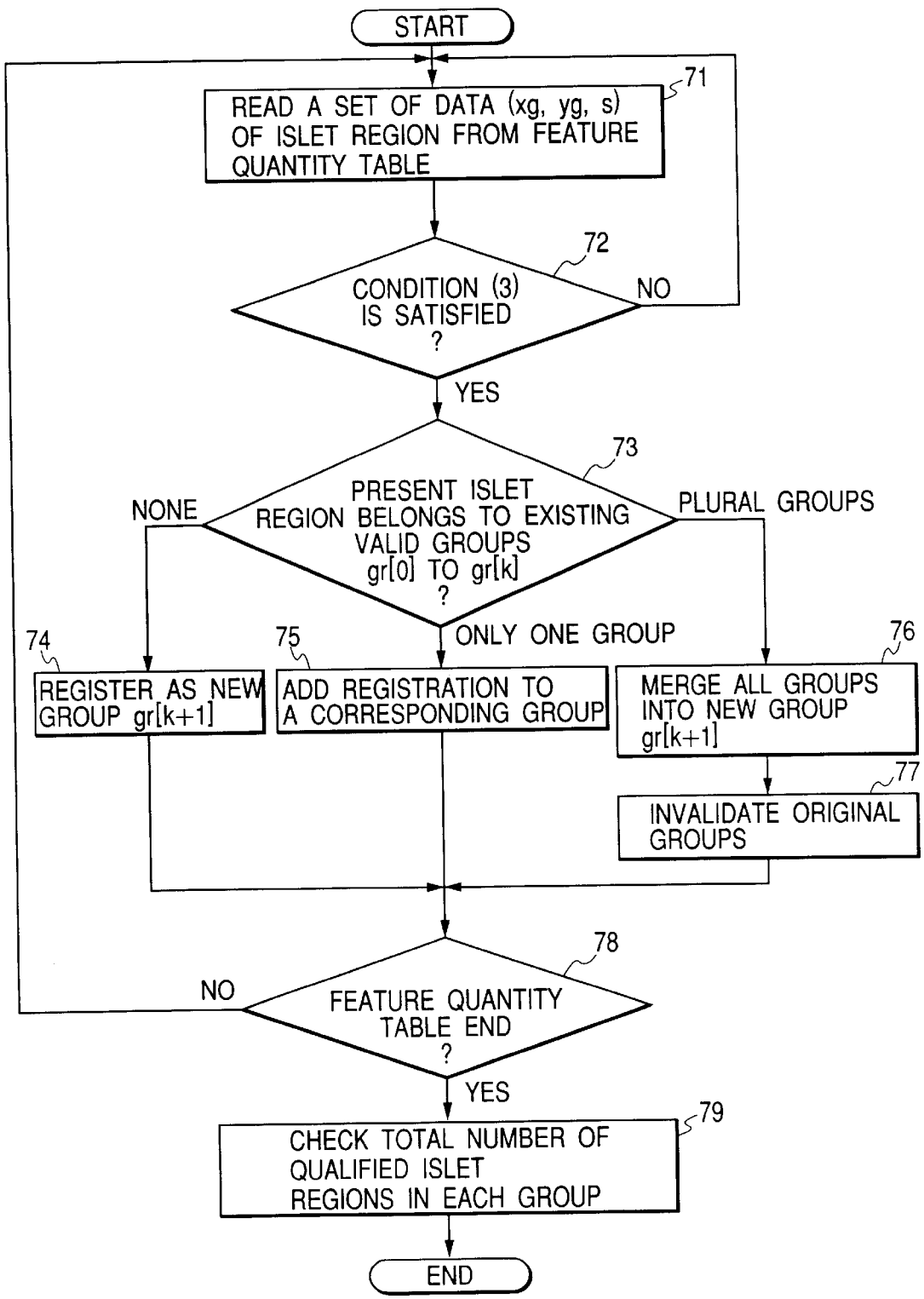
FIG. 7 is a flowchart showing a procedure performed by a region judging section of the bar code image processing apparatus in accordance with the preferred embodiment of the present invention.

Next, the region judging section 4 will be explained with reference to FIGS. 7 and 8. FIG. 7 is a flowchart showing details of a grouping procedure performed in the region judging section 4. FIG. 8 is a group table which is referred to in the grouping procedure. The group table is defined as a structural body "gr."

In FIG. 7, step 71 reads the feature quantity of one islet region from the feature quantity table. The feature quantity is a set of the center-of-gravity coordinates (xg, yg) and the area "s." Next, step 72 judges whether the area "s" satisfies the following condition (3) which is used to identify a bar type among the long bar, the semi-long bar and the timing bar.

Long bar: $(1-t1) \cdot H1 \cdot W1 \leq s \leq (1+t1) \cdot H1 \cdot W1$; or

Semi-long bar: $(1-t1) \cdot H2 \cdot W1 \leq s \leq (1+t1) \cdot H2 \cdot W1$; or Timing bar: $(1-t1)H3 \cdot W1 \leq s \leq (1+t1) \cdot H3 \cdot W1$ \hfill (3)

where t1 is a tolerance.

When all of condition (3) is not satisfied (i.e., "No" in the step 72), the control flow returns to the step 71 to read the feature quantity of the next islet region from the feature quantity table. When the judgement result is "Yes" in the step 72, the control flow proceeds to step 73.

Step 73 judges which group the present islet region belongs to among all of existing groups gr[0] to gr[k] which have valid information (i.e., valid gr_flag=1). More specifically, a distance "d" is defined as a distance between a center-of-gravity position of the present islet region and a center-of-gravity position of a member of a compared group. It is checked whether the distance "d" is within a predetermined range defined by the following condition (4).

$$(1-t2)\cdot p \leq d \leq (1+t2)\cdot p \tag{4}$$

When the present islet region belongs to none of the existing groups, the control flow proceeds to step 74 to register a new group gr[k+1] in the group table. In this case, the valid flag is set to 1. A candidate flag "bar_flag" is set to 0, and "member" is set to 0. The "member" represents a total number of the islet regions qualified through the judgement. More specifically, the (x,y) coordinate values of the center-of-gravity position, an area, and a bar type of the qualified islet region are registered in x[0], y[0], s[0] and bar[0], as an initial group. Regarding the bar type, 1 is assigned to the long bar, 2 is assigned to the semi-long bar, and 3 is assigned to the timing bar.

When the present islet region belongs to a specific one of the existing groups, the control flow proceeds to step 75 to increment the "member" by 1 and register its feature quantity (i.e., center-of-gravity position, area, and bar type) as additional data.

When the present islet region belongs to a plurality of existing groups, the control flow proceeds to step 76 to merge them into a new group gr[k+1]. More specifically, the "member" is set to a value which is larger by 1 than a sum of the members of the merged groups. The feature quantities (i.e., center-of-gravity position, area, and bar type) of all member and the presently concerned islet region are registered. Then, the control flow proceeds to step 77 to invalidate the plurality of original groups which are merged this time. That is, the valid flags of these groups are reset to 0.

After finishing each of the steps 74, 75 and 77, the control procedure proceeds to step 78. Step 78 judges whether all of data in the candidate feature quantity table are processed completely. When the judgement result is "No" in the step 78, the control flow returns to the step 71 to read a center-of-gravity position of the next feature quantity listed in the candidate feature quantity table. When the judgement result is "Yes" in the step 78, the control flow proceeds to step 79. Step 79 checks the total number of the qualified islet regions of each group which are produced by the above-described processing to judge whether each group is a bar code candidate region. It is assumed that N represents a total number of bars consisting of a bar code. When the "member" is equal to or larger than N, the candidate flag "bar_flag" of this group is set to 1, otherwise set to 0. Accordingly, through the above-described processing, it becomes possible to detect the center-of-gravity position and the type of each bar involved in the bar code candidate region.

Figure 9:
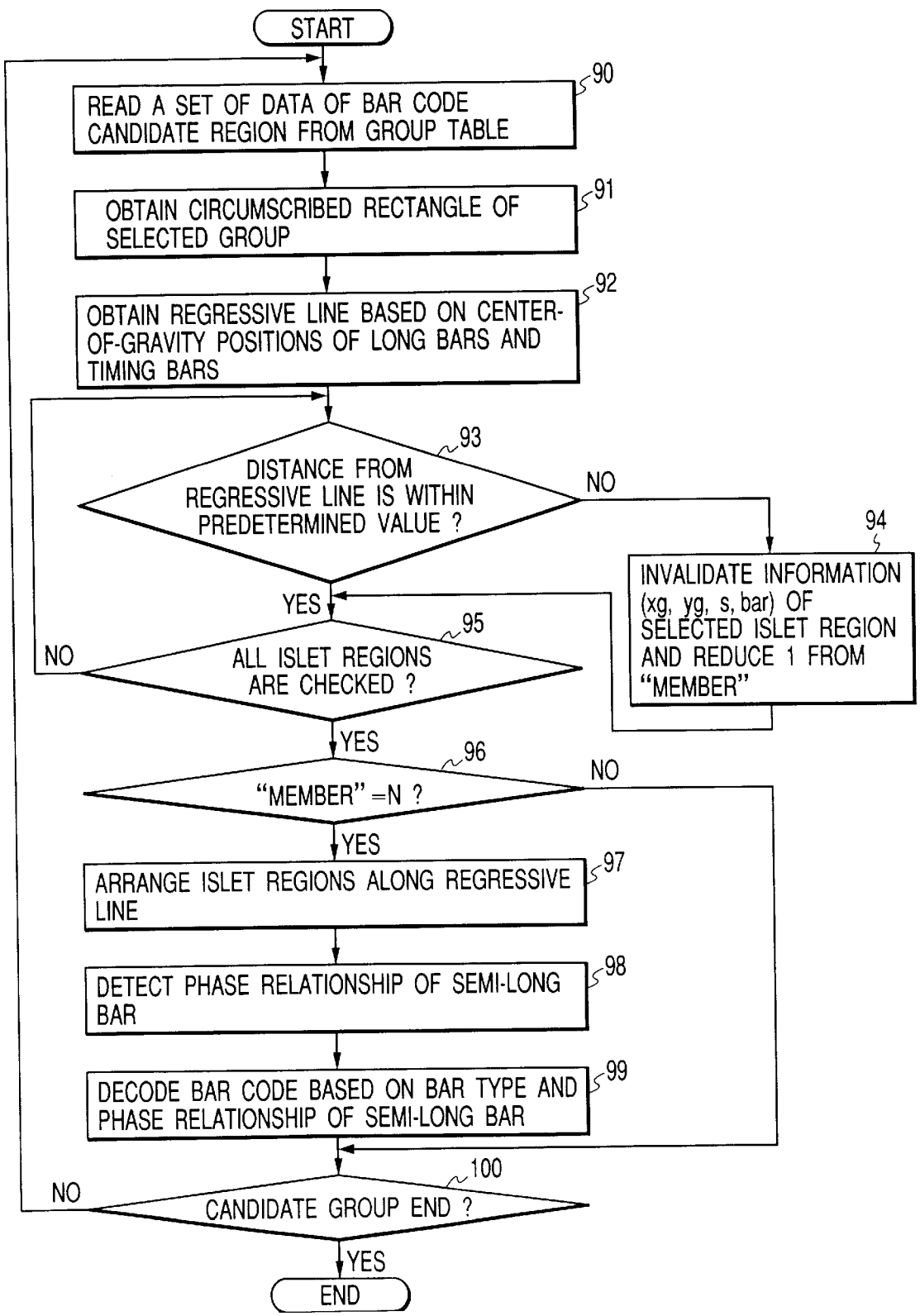
FIG. 9 is a flowchart showing a decoding procedure performed by the decoding section of the bar code image processing apparatus in accordance with the preferred embodiment of the present invention.
Figure 10:
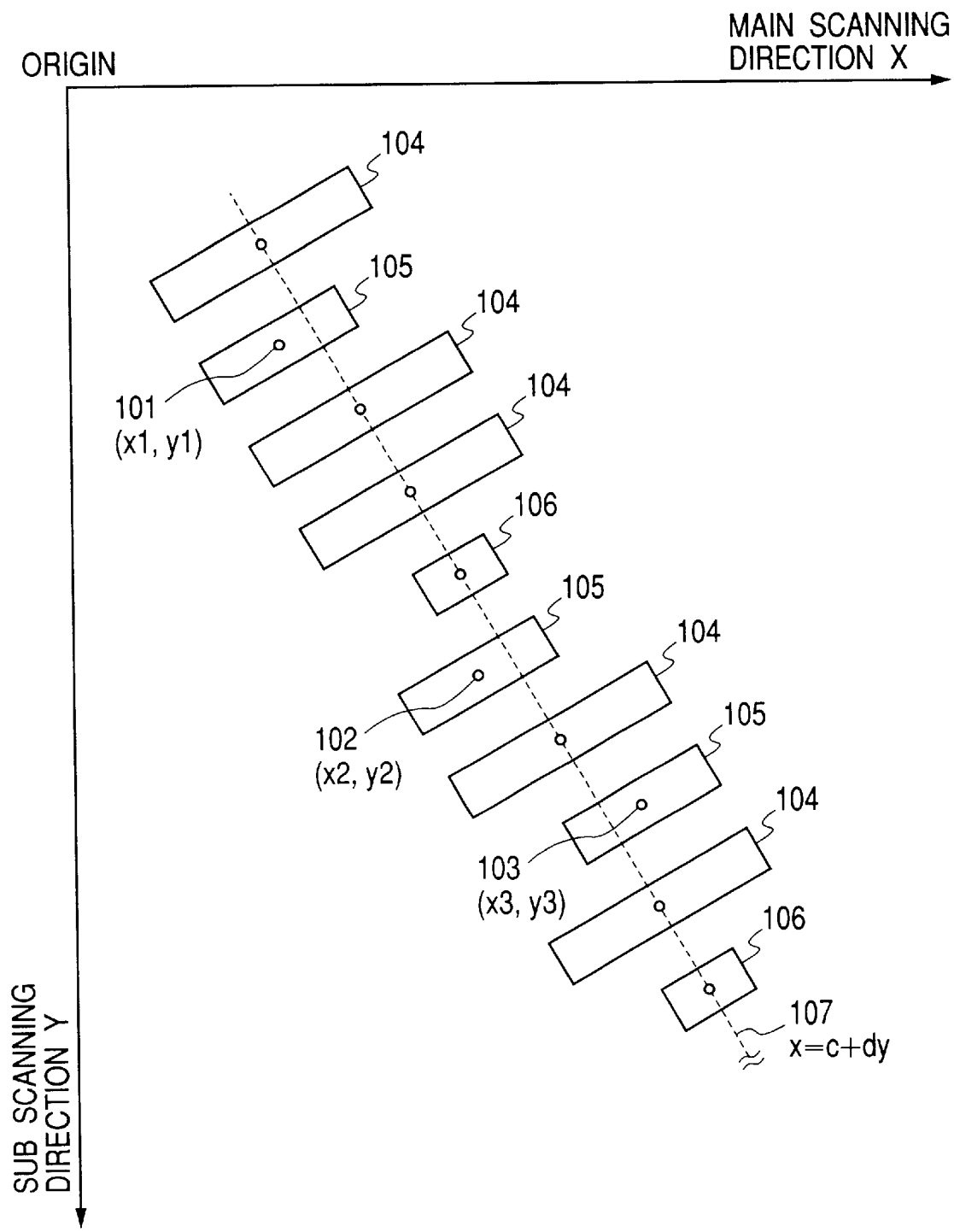
FIG. 10 is a view showing a practical arrangement of a bar code, which is detected by the decoding section of the bar code image processing apparatus in accordance with the preferred embodiment of the present invention.
Figure 11:
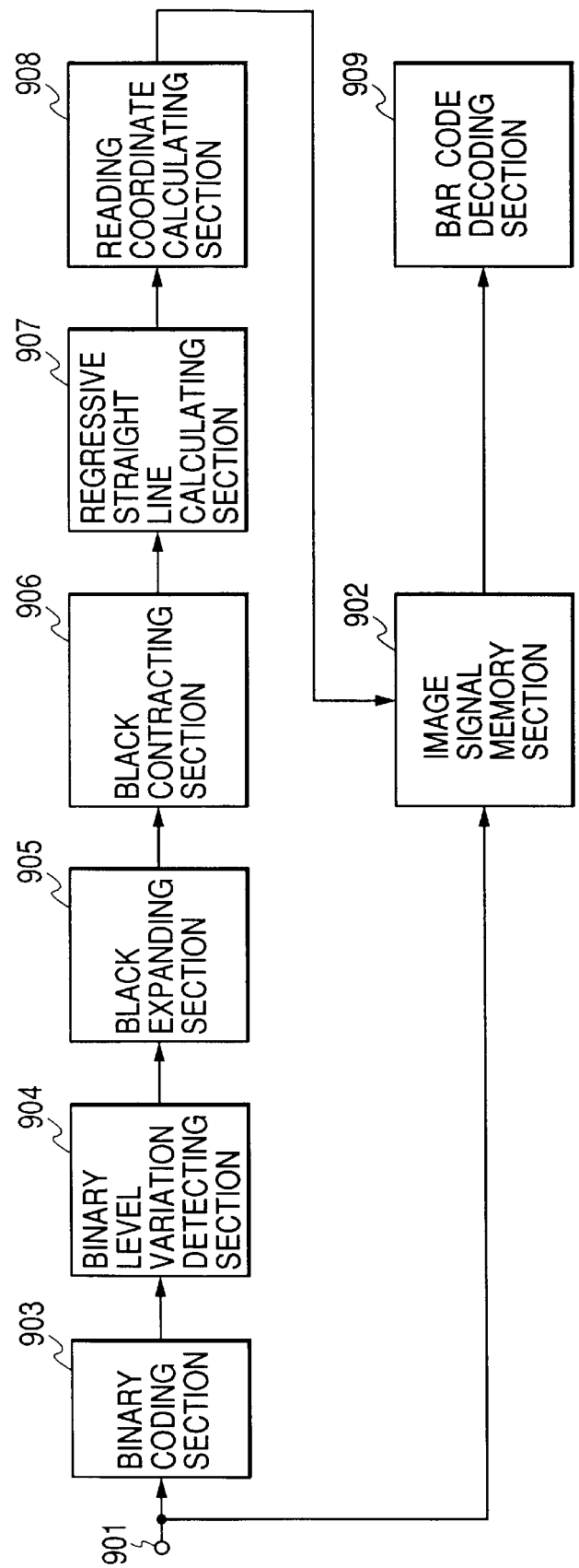
FIG. 11 is a block diagram showing a conventional bar code image processing apparatus.

Next, a decoding procedure performed in the decoding section 5 will be explained with reference to FIGS. 9 and 10. FIG. 9 is a flowchart showing details of the bar code decoding procedure. FIG. 10 is a view showing a phase relationship of the semi-long bar with respect to the center line of the bar code.

In the flowchart of FIG. 9, step 90 reads the data of a bar code candidate region from the group table, when the candidate flag of this candidate region is set to 1. Step 91 obtains a minimum circumscribed rectangle enclosing all islet regions (i.e., members) belonging to this group based on the center-of-gravity coordinates of the islet regions. The minimum circumscribed rectangle is defined by a minimum value (xmin) and a maximum value (xmax) among the x coordinates of all of the islet regions, as well as a minimum value (ymin) and a maximum value (ymax) among the y coordinates of all of the islet regions. In other words, the minimum circumscribed rectangle is a rectangle whose four corners are positioned at coordinates (xmin, ymin), (xmax, ymin), (xmin, ymax), and (xmin, ymax).

When the circumscribed rectangle has an x-directional side longer than its y-directional side, an angle between the center line of the bar code and the x axis is within ±45°. On the other hand, when the circumscribed rectangle has an x-directional side shorter than its y-directional side, an angle between the center line of the bar code and the y axis is within ±45°.

Step 92 obtains a regressive straight line passing the center-of-gravity points of the long bars and the timing bars judged by the grouping procedure. The regressive straight line is expressed by an equation y=a+bx, when the angle between the center line of the bar code and the x axis is within ±45°. Constants "a" and "b" in this equation are obtained by the following equations (5).

$$b = \frac{n \cdot \sum x \cdot y - \sum x \cdot \sum y}{n \cdot \sum x^2 - (\sum x)^2} \text{ and} \tag{5}$$

$$a = \frac{\sum x^2 \cdot \sum y - \sum x \cdot \sum x \cdot y}{n \cdot \sum x^2 - (\sum x)^2}$$

where n is the total number of the long bars and the timing bars.

On the other hand, the regressive straight line is expressed by an equation x=c+dy, when the angle between the center line of the bar code and the y axis is within ±45°. Constants "c" and "d" in this equation are obtained by the following equations (6).

$$d = \frac{n \cdot \sum x \cdot y - \sum x \cdot \sum y}{n \cdot \sum y^2 - (\sum y)^2} \text{ and} \tag{6}$$

$$c = \frac{\sum x \cdot \sum y^2 - \sum y \cdot \sum x \cdot y}{n \cdot \sum y^2 - (\sum y)^2}$$

Next, the control flow proceeds to step 93 to calculate a distance between the center-of-gravity position of each islet region and the circumscribed straight line. Then, step 93 judges whether the calculated distance is within a predetermined value δ. When the calculated distance exceeds the predetermined value δ (i.e., "No" in the step 93), the control flow proceeds to step 94. When the judgement result is "Yes" in the step 93, the control flow proceeds to step 95. In this case, the distance from a point (x, y) to a line is calculated in the following manner. When the angle between the center line and the x axis is within ±45°, the distance is calculated according to the following equation (7) which corresponds to the equation (5).

$$\frac{|y - a - b \cdot x|}{\sqrt{1 + b^2}} \tag{7}$$

When the angle between the center line and the y axis is within ±45°, the distance is calculated according to the following equation (8) which corresponds to the equation (6).

$$\frac{|x - c - d \cdot y|}{\sqrt{1 + d^2}} \qquad (8)$$

Step 94 invalidates the information of the corresponding islet region. The values in the items {x, y, s, bar} of the group table are invalidated (i.e., replaced by −1) and the total number of the islet regions, i.e., "member", is reduced by 1. After completing the step 94, the control flow proceeds to the step 95. Step 95 checks whether all of the islet regions are checked regarding the judgement of step 93. When the check of all islet regions is entirely finished (i.e., "Yes" in the step 95), the control flow proceeds to step 96. When the judgement result is "No" in the step 95, the control flow returns to the step 93.

Step 96 judges whether the total number "member" of the islet regions is identical with the total number (N) of the bars involved in a bar code (i.e., "member"=N?). When the coincidence is recognized (i.e., "Yes" in the step 96), the control flow proceeds to step 97. When the judgement result is "No" in the step 96, it is concluded that this group is not a bar code. Thus, the control flow proceeds to step 100.

Step 97 arranges the islet regions along the circumscribed straight line. This arrangement is a preparation for the decode operation of a detected bar code performed in a later-described step 99. More specifically, when the angle between the center line and the x axis is within ±45°, they are sorted in accordance with their x coordinate values. When the angle between the center line and the y axis is within ±45°, they are sorted in accordance with their y coordinate values.

Next, step 98 detects a phase relationship of each semi-long bar with respect to the center line of the bar code. FIG. 10 shows a detailed example of the bar code including long bars 104, semi-long bars 105, and timing bars 106.

According to the bar code arrangement shown in FIG. 10, the angle between the center line 107 (x=c+dy) and the y axis is within ±45°. There are three semi-long bars 105 having their center-of-gravities on the points 101 (x1, y1), 102 (x2, y2) and 103 (x3, y3). In this case, x1<c+dy1, x2<c+dy2, and x3>c+dy3. In other words, the center-of-gravity positions 101 and 102 are located at a negative side with respect to the center line 107. The center-of-gravity position 103 is located at a positive side with respect to the center line 107.

Subsequently, step 99 searches or retrieves each islet region of this group one by one. Each islet region is converted into a corresponding bar in accordance with the bar type and the semi-long bar's phase relationship with respect to the regressive straight line. Although not shown, a code conversion table is referred to in this conversion processing. By processing all of the islet regions belonging to the same group, a decoding of the detected bar code is accomplished.

Thereafter, the control flow proceeds to the step 100 to check whether all of the candidate groups processed. When the judgement result is "No" in the step 100, the control flow returns to the step 90 to read the data of the next bar code candidate region from the group table and repeat the above-described processing. When the judgement result is "Yes" in the step 100, this routine is terminated.

According to the above-described preferred embodiment of the present invention, the used bar code is a 4-state code including a long bar, a semi-long bar and a timing bar. Needless to say, the 4-state code can be replaced by a JAN code which is widely used. When the JAN code is used, the step 72 shown in FIG. 7 will be modified so as to discriminate the thickness (thick or narrow) of each bar based on the area judgement. Furthermore, the step 98 shown in FIG. 9 will be modified so as to detect a distance between islet regions to detect a relationship between a bar and a space, instead of detecting the phase relationship.

The bar code thus decoded is generally used in a mail sorting machine, a cargo classification system, or a register used in a supermarket.

This invention may be embodied in several forms without departing from the spirit of essential characteristics thereof. The present embodiment as described is therefore intended to be only illustrative and not restrictive, since the scope of the invention is defined by the appended claims rather than by the description preceding them. All changes that fall within the metes and bounds of the claims, or equivalents of such metes and bounds, are therefore intended to be embraced by the claims.

What is claimed is:

1. A bar code image processing apparatus comprising:
   scanning means for scanning all patterns involved in a document image which includes at least one bar code;
   labeling means for labeling all of the scanned patterns of said document image and for detecting a plurality of feature quantities of each labeled region, including a center position of each labeled region;
   region detecting means for making a group of labeled regions spaced at a predetermined positional relationship based on feature quantities of said labeled regions and for detecting a bar code candidate region; and
   decoding means for identifying a type of each bar involved in said bar code candidate region and for decoding the bar code, wherein a combination of said center position of said each bar code and another feature quantity of said each bar code is considered in identifying the type of each bar,
   wherein by scanning all the patterns involved in the document image and by labeling all of the scanned patterns, said scanning means obtains scanned patterns without using expansion and contraction processing.

2. The bar code image processing apparatus in accordance with claim 1, further comprising small pattern removing means for erasing predetermined small patterns from said document image before said document image is labeled.

3. The bar code image processing apparatus in accordance with claim 1, wherein said labeling means detects a labeled region which requires no rewriting as a result of a detection of identity between labels.

4. The bar code image processing apparatus in accordance with claim 1, wherein said labeling means detects at least one feature quantity selected from the group consisting of an area, a peripheral length and a circumscribed rectangle.

5. The bar code image processing apparatus in accordance with claim 1, wherein said decoding means decodes said bar code based on an area and a center position of each bar.

6. The bar code image processing apparatus in accordance with claim 1, wherein said bar code includes a long bar, a semi-long bar and a timing bar.

7. The bar code image processing apparatus in accordance with claim 6, wherein said decoding means discriminates a bar among said long bar, said semi-long bar and said timing bar based on an area of each pattern.

8. The bar code image processing apparatus in accordance with claim 1, wherein said bar code is a JAN code.

9. A bar code image processing apparatus comprising:

labeling means for labeling a document image including a bar code and for detecting a feature quantity including a center position of each labeled region;

region detecting means for making a group of labeled regions spaced at a predetermined positional relationship based on feature quantities of said labeled regions and detecting a bar code candidate region; and decoding means for identifying a type of each bar based on the feature quantity involved in said bar code candidate region and for decoding the bar code, wherein said bar code includes a long bar, a semi-long bar and a timing bar, and said decoding means discriminates a bar among said long bar, said semi-long bar and said timing bar based on an area of each pattern, and said decoding means obtains a line passing center positions of said long and timing bars, and detects a phase relationship of said semi-long bar with respect to said obtained line to decode said bar code based on the obtained phase relationship.

10. A bar code image processing apparatus comprising:

labeling means for labeling a document image including a bar code and for detecting a feature quantity including a center position of each labeled region;

region detecting means for making a group of labeled regions spaced at a predetermined positional relationship based on feature quantities of said labeled regions and detecting a bar code candidate region; and decoding means for identifying a type of each bar based on the feature quantity involved in said bar code candidate region and for decoding the bar code, wherein said decoding means obtains a line passing center positions of predetermined bars included in said bar code and detects a phase relationship of specific bars with respect to said obtained line to decode said bar code based on the obtained phase relationship, wherein said bar code includes a long bar, a semi-long bar and a timing bar, and said decoding means obtains said line passing center positions of said long and timing bars, and detects a phase relationship of said semi-long bar with respect to said obtained line to decode said bar code based on the phase relationship.

* * * * *